US009282282B2

(12) United States Patent
Jeong

(10) Patent No.: US 9,282,282 B2
(45) Date of Patent: Mar. 8, 2016

(54) METHOD FOR PROVIDING VIDEO COMMUNICATION SERVICE AND ELECTRONIC DEVICE THEREOF

(71) Applicant: Samsung Electronics Co. Ltd., Suwon-si, Gyeonggi-do (KR)

(72) Inventor: Jae-Cheon Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 13/923,914

(22) Filed: Jun. 21, 2013

(65) Prior Publication Data

US 2014/0002574 A1 Jan. 2, 2014

(30) Foreign Application Priority Data

Jul. 2, 2012 (KR) ........................ 10-2012-0071966

(51) Int. Cl.
*H04N 7/14* (2006.01)
*G06F 3/16* (2006.01)
*H04N 7/00* (2011.01)

(52) U.S. Cl.
CPC .................. *H04N 7/14* (2013.01); *G06F 3/165* (2013.01); *H04N 7/141* (2013.01); *H04N 7/002* (2013.01)

(58) Field of Classification Search
USPC .......................... 370/260; 709/204; 348/14.1
See application file for complete search history.

(56) References Cited

U.S. PATENT DOCUMENTS

| 8,880,605 B2* | 11/2014 | Mao et al. ..................... 709/204 |
| 2003/0035001 A1* | 2/2003 | Van Geest ......... H04N 13/0468 715/753 |
| 2004/0013252 A1* | 1/2004 | Craner ..................... 379/142.01 |
| 2006/0077258 A1* | 4/2006 | Allen et al. ................... 348/169 |
| 2006/0126894 A1* | 6/2006 | Mori ............................. 382/103 |
| 2007/0165106 A1* | 7/2007 | Groves ............. H04L 29/06027 348/14.08 |
| 2008/0062252 A1* | 3/2008 | Kawamura et al. ........ 348/14.09 |
| 2008/0278516 A1* | 11/2008 | Santon ................... H04N 7/144 345/619 |
| 2010/0097441 A1* | 4/2010 | Trachtenberg et al. .... 348/14.08 |
| 2011/0085017 A1* | 4/2011 | Robinson ............ H04L 12/1827 348/14.08 |
| 2011/0096140 A1* | 4/2011 | Samadani .............. H04N 7/147 348/14.16 |
| 2012/0294118 A1* | 11/2012 | Haulick et al. ................. 367/121 |
| 2013/0072820 A1* | 3/2013 | Lee ...................... A61B 5/1071 600/594 |
| 2013/0083944 A1* | 4/2013 | Kvist et al. ...................... 381/92 |
| 2014/0062882 A1* | 3/2014 | Ozawa et al. .................. 345/158 |
| 2014/0210964 A1* | 7/2014 | Muijs ................. H04N 13/0475 348/54 |

FOREIGN PATENT DOCUMENTS

| KR | 2001-0016583 A | 3/2001 |
| KR | 10-2005-0061188 A | 6/2005 |
| KR | 10-2007-0029490 A | 3/2007 |
| KR | 10-2007-0045651 A | 5/2007 |
| KR | 20-2009-0010019 U | 10/2009 |
| KR | 10-2011-0025718 A | 3/2011 |

* cited by examiner

*Primary Examiner* — Creighton Smith
(74) *Attorney, Agent, or Firm* — Jefferson IP Law, LLP

(57) ABSTRACT

A method and an apparatus for providing a video communication service in an electronic device are provided. In the method, a distance from the electronic device to a user's face is determined. A control variable of video communication data is determined with consideration of the distance. The video communication service is provided with consideration of the control variable.

18 Claims, 14 Drawing Sheets

| DISTANCE UP TO USER | WEIGHT |
|---|---|
| LESS THAN 05CM | X 0.4 |
| EQUAL TO OR GREATER THAN 10CM AND LESS THAN 15CM | X 0.6 |
| EQUAL TO OR GREATER THAN 15CM AND LESS THAN 20CM | X 0.8 |
| EQUAL TO OR GREATER THAN 20CM AND LESS THAN 25CM | X 1.0 |
| EQUAL TO OR GREATER THAN 25CM AND LESS THAN 30CM | X 1.2 |
| EQUAL TO OR GREATER THAN 30CM AND LESS THAN 35CM | X 1.4 |
| EQUAL TO OR GREATER THAN 35 CM | X 1.6 |

FIG.11

METHOD FOR PROVIDING VIDEO COMMUNICATION SERVICE AND ELECTRONIC DEVICE THEREOF

PRIORITY

This application claims the benefit under 35 U.S.C. §119 (a) of a Korean patent application filed on Jul. 2, 2012 in the Korean Intellectual Property Office and assigned Serial No. 10-2012-0071966, the entire disclosure of which is hereby incorporated by reference.

BACKGROUND OF THE INVENTION

1. Field of the Invention

The present invention relates to an apparatus and a method for an electronic device. More particularly, the present invention relates to an apparatus and a method for providing a video communication service in an electronic device.

2. Description of the Related Art

An electronic device has become a daily necessity for most people because it provides easy portability and various services. As technology has evolved, the electronic device has concurrently evolved into a multimedia electronic device that provides a data communication service and various additional services as well as a voice communication service. For example, the electronic device may provide a video communication service that uses a data communication service.

A video communication service allows a user to perform communication that includes viewing an image of a counterpart user as well as receiving the voice of the counterpart user. In the case where the electronic device provides a video communication service, a user of the electronic device typically grips the electronic device with his hand and performs communication while viewing a screen at a position separated by a predetermined distance. Based on this type of use, the distance between the user and the electronic device increases. Thus, a transmission volume and an image transferred to the counterpart user are reduced in proportion to the distance.

As described above, in case of using a video communication service, the user of the electronic device is inconvenienced by having to talk with a loud voice as the distance between the electronic device increases. Also, the counterpart user has a difficulty in performing swift communication due to the user's inconstant voice.

Therefore, there is a need for an apparatus and a method for providing a swift video communication service even when a distance between the electronic device and the user increases.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a device and a method for providing a video communication service in an electronic device.

Another aspect of the present invention is to provide a device and a method for controlling a transmission volume of a video communication service with consideration of a distance from the electronic device to a user's face.

Still another aspect of the present invention is to provide a device and a method for transmitting a transmission volume weight depending on a distance from the electronic device to a user's face.

Yet another aspect of the present invention is to provide a device and a method for controlling a reception volume of a video communication service with consideration of a distance from the electronic device to a user's face.

Another aspect of the present invention is to provide a device and a method for controlling magnification of a camera with consideration of a distance from the electronic device to a user's face.

Still another aspect of the present invention is to provide a device and a method for controlling a screen size of a video communication service with consideration of a distance from the electronic device to a user's face.

In accordance with an aspect of the present invention, a method for providing a video communication service in an electronic device is provided. The method includes determining a distance from the electronic device to a user's face, determining a control variable of video communication data with consideration of the distance, and providing the video communication service with consideration of the control variable.

In accordance with another aspect of the present invention, a method for providing a video communication service in an electronic device is provided. The method includes receiving video communication data from a communication counterpart, determining a volume of a voice included in the video communication data with consideration of a transmission volume weight of the communication counterpart from the video communication data, and providing the video communication service with consideration of the volume of the voice.

In accordance with still another aspect of the present invention, an electronic device for providing a video communication service is provided. The device includes at least one processor, a memory, and at least one program stored in the memory and configured for being executable by the at least one processor, wherein the at least one program includes at least one instruction for determining a distance from the electronic device to a user's face, determining a control variable of video communication data with consideration of the distance, and providing a video communication service with consideration of the control variable.

In accordance with yet another aspect of the present invention, a device for providing a video communication service is provided. The device includes at least one processor, a memory, and at least one program stored in the memory and configured for being executable by the at least one processor, wherein the at least one program includes at least one instruction for receiving video communication data from a communication counterpart, determining a volume of a voice included in the video communication data with consideration of a transmission volume weight of the communication counterpart from the video communication data, and providing the video communication service with consideration of the volume of the voice.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 11 is a view illustrating a transmission volume weight table with consideration of a distance from an electronic device to a user's face according to an exemplary embodiment of the present invention.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a technology for providing a video communication service in an electronic device. Here, it is assumed that a user allows a front camera of the electronic device to face the user's face direction while gripping the electronic device when using a video communication service.

In the following description, the electronic device includes a mobile communication terminal, a Personal Digital Assistant (PDA), a laptop computer, a smart phone, a netbook, a television, a Mobile Internet Device (MID), an Ultra Mobile PC (UMPC), a table Personal Computer (PC), a navigation device, an MP3 player, etc.

Figure 1:
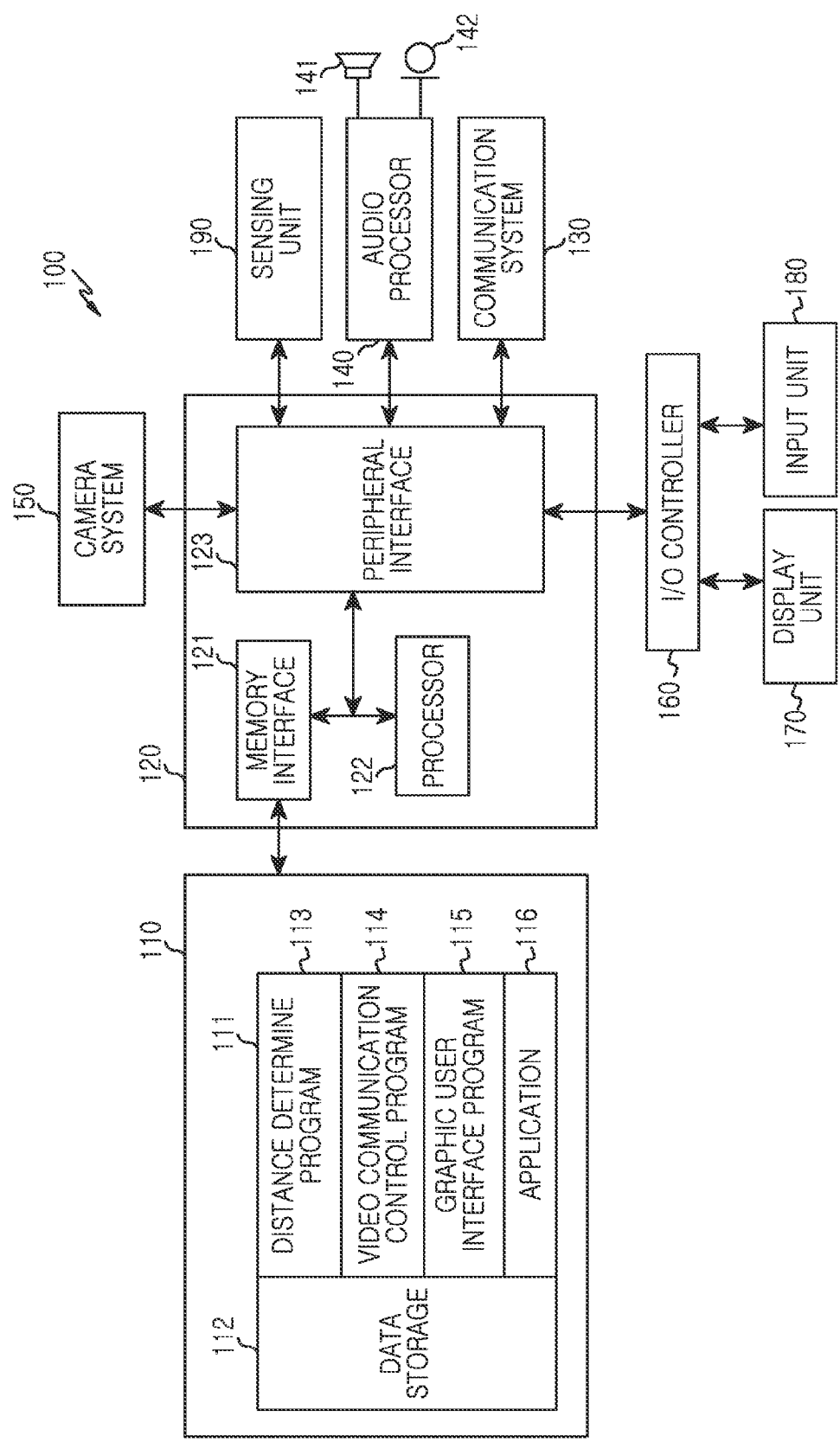
FIG. 1 is a block diagram illustrating an electronic device according to an exemplary embodiment of the present invention.

FIG. 1 is a block diagram illustrating an electronic device according to an exemplary embodiment of the present invention.

Referring to FIG. 1, the electronic device 100 includes a memory 110, a processor unit 120, a communication system 130, an audio processor 140, a camera system 150, an Input/Output (I/O) controller 160, a display unit 170, an input unit 180, and a sensing unit 190. Here, a plurality of memories 110, processor units 120, communication systems 130, audio processors 140, camera systems 150, I/O controllers 160, display units 170, input units 180, and sensing units 190 may be provided.

Each element is described below.

The memory 110 includes a program storage 111 for storing a program for controlling an operation of the electronic device 100 and a data storage 112 for storing data generated during execution of a program. For example, the data storage 112 stores a reference image for determining a distance from the electronic device to a user's face. Also, the data storage 112 stores a table of transmission volume weight depending on the distance from the electronic device to the user's face.

For another example, the program storage 111 includes a distance determine program 113, a video communication control program 114, a graphic user interface program 115, and at least one application 116. Here, a program included in the program storage 111 is a set of instructions and may be expressed as an instruction set.

The distance determine program 113 includes at least one software element for determining the distance from the electronic device to the user's face. For example, the distance determine program 113 compares the user's face area obtained via the camera system 150 with the user's face area obtained from the reference image at a point of providing a video communication service to determine the distance from the electronic device to the user's face. Here, the reference image denotes an image of the user positioned at a reference distance.

For another example, the distance determine program 113 may compare each distance of the user's eyes, nose, and mouth obtained via the camera system 150 with each distance of the user's eyes, nose, and mouth obtained from the reference image at a point of providing the video communication service to determine the distance from the electronic device to the user's face.

For still another example, the distance determine program 113 may determine the distance from the electronic device to the user's face with consideration of a time difference between a point of generating ultrasonic waves and a point at which ultrasonic waves are reflected and received using an ultrasonic sensor of the sensing unit 190.

For still yet another example, the distance determine program 113 may determine the distance from the electronic device to the user's face with consideration of an amount of coordinate change based on a coordinate of a point of providing a video communication service using an acceleration sensor of the sensing unit 190.

The video communication control program 114 determines a control variable of video communication data with consideration of the distance from the electronic device to the user's face, and includes at least one software element for providing the video communication service with consideration of the control variable. Here, the control variable includes at least one of a transmission volume weight of video communication data, a reception volume weight, a microphone sensitivity weight, a screen size weight, and a camera magnification weight. For example, the video communication control program 114 determines the transmission volume weight with consideration of the distance from the electronic device to the user's face. In the case where a voice for the video communication service is detected, the video communication control program 114 updates the volume of the detected voice with consideration of the transmission volume weight. At this point, the video communication control program 114 transmits video communication data including the updated voice.

For another example, the video communication control program 114 determines the transmission volume weight with consideration of the distance from the electronic device to the user's face. In the case where a voice for the video communication service is detected, the video communication control program 114 transmits video communication data including the detected voice and the transmission volume weight.

For still another example, the video communication control program 114 determines the reception volume weight with consideration of the distance from the electronic device to the user's face. In the case where video communication data is received, the video communication control program 114 transmits a voice included in the video communication data with consideration of the reception volume weight.

For still yet another example, the video communication control program 114 determines the microphone sensitivity weight with consideration of the distance from the electronic device to the user's face. After determining the microphone sensitivity weight, the video communication control program 114 determines microphone sensitivity with consideration of the microphone sensitivity weight. After that, the video communication control program 114 detects a voice for the video communication service via a microphone. At this point, the video communication control program 114 transmits video communication data including the detected voice. In the case where the distance from the electronic device to the user's face is greater than a reference distance, the video communication control program 114 raises the microphone sensitivity. Also, in the case where the distance from the electronic device to the user's face is less than the reference distance, the video communication control program 114 lowers the microphone sensitivity.

For another example, the video communication control program 114 determines a screen size weight of video communication data with consideration of the distance from the electronic device to the user's face. In the case where video communication data is received, the video communication control program 114 determines a screen size of a communication counterpart included in the video communication data with consideration of the screen size weight. At this point, the video communication control program 114 displays an image of the communication counterpart included in the video communication data with consideration of the determined screen size. In the case where the distance from the electronic device to the user's face is greater than the reference distance, the video communication control program 114 determines to magnify the screen size based on the face of the communication counterpart in the image. Also, in the case where the distance from the electronic device to the user's face is less than the reference distance, the video communication control program 114 determines to maintain the screen size of the communication counterpart in the image as a basic size.

For still another example, the video communication control program 114 determines a camera magnification weight with consideration of the distance from the electronic device to the user's face. After determining the camera magnification weight, the video communication control program 114 obtains an image of the user via the camera system 150. At this point, the video communication control program 114 transmits video communication data including an image of the user obtained via the camera system 150.

The graphic user interface program 115 includes at least one software element for providing and displaying graphics on the display unit 170 in cooperation with the video communication control program 114.

The application 116 includes a software element for at least one application installed in the electronic device 100.

The processor unit 120 includes a memory interface 121, at least one processor 122, and a peripheral interface 123. Here, the memory interface 121, the at least one processor 122, and the peripheral interface 123 included in the processor unit 120 may be integrated in at least one integrated circuit or realized as separate elements.

The memory interface 121 controls access of the elements such as the processor 122 and the peripheral interface 123.

The peripheral interface 123 controls connections of an I/O peripheral device and the processor 122 of the electronic device 100 and the memory interface 121.

The processor 122 controls the electronic device 100 to provide various multimedia services using at least one software program. The processor 122 executes at least one program stored in the memory 110 to provide a service corresponding to the relevant program. For example, as will be explained in more detail with reference to FIG. 2 below, the processor 122 includes a distance determine processor 200 for executing the distance determine program 113, a video communication control processor 210 for executing the video communication control program 114, and a graphic user interface processor 220 for executing the graphic user interface program 115.

The communication system 130 includes at least one software element for performing a communication function for voice communication and data communication. The communication system may be divided into a plurality of communication submodules for supporting different communication networks. For example, though not limited thereto, the communication network may include a Global System for Mobile Communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a wireless LAN, a Bluetooth network, a Near Field Communication (NFC) network, etc.

The audio processor 140 provides an audio interface between a user and the electronic device 100 via a speaker 141 and a microphone 142.

The camera system 150 performs a function for shooting moving picture data and still picture data.

The I/O controller 160 provides an interface between an I/O unit such as the display unit 170, the input unit 180, etc. and the peripheral interface 123.

The display unit 170 displays status information of the electronic device 100, a character input by a user, a moving picture, a still picture, etc.

The display unit 170 may be a touchscreen. In this case, the display unit 170 provides touch information of the touchscreen to the processor unit 120 via the I/O controller 160.

The input unit 180 provides input data generated by the user's selection to the processor unit 120 via the I/O controller 160. For example, the input unit 180 includes only a control button for controlling the electronic device 100. For another example, the input unit 180 may include a keypad for receiving input data from a user.

The sensing unit 190 detects movement of the electronic device or status information of the neighborhood of the electronic device. For example, an ultrasonic sensor determines the distance from the electronic device to the user's face with consideration of a time difference between a point of generating ultrasonic waves and a point at which the ultrasonic waves are reflected and received. For another example, an acceleration sensor may determine the distance from the electronic device to the user's face with consideration of an amount of coordinate change based on a coordinate of a point of providing the video communication service.

Figure 2:
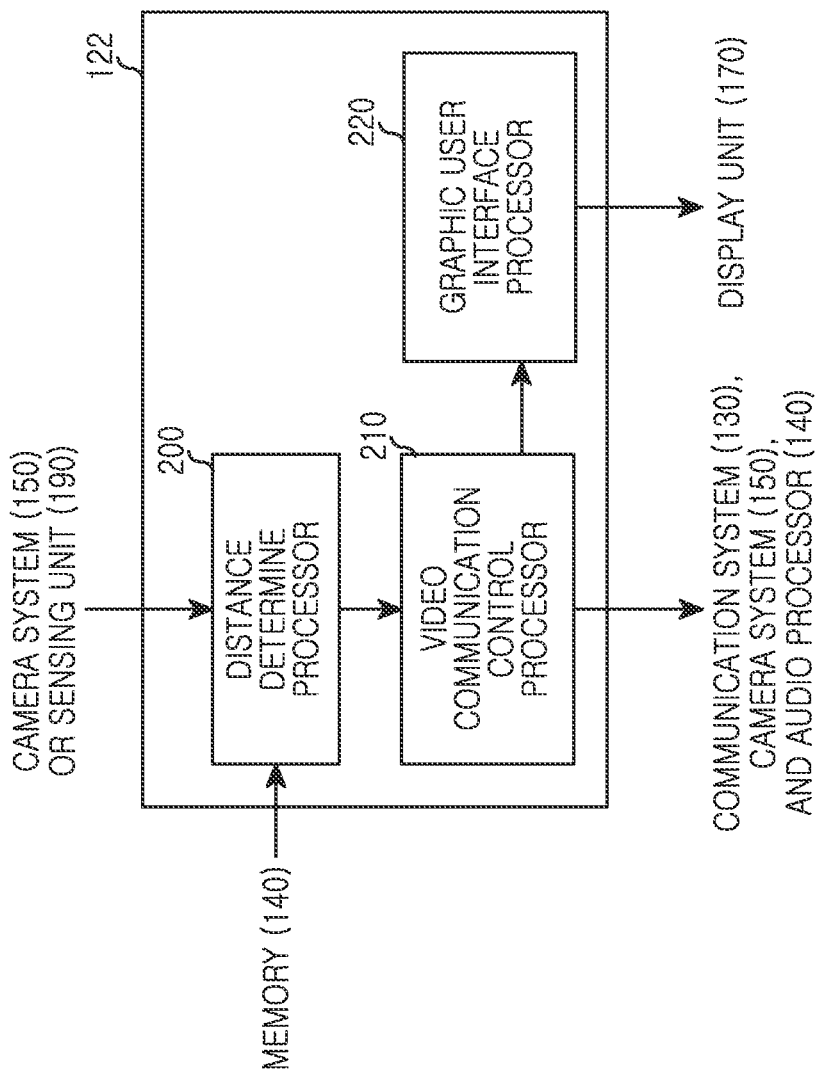
FIG. 2 is a block diagram illustrating a processor according to an exemplary embodiment of the present invention.

FIG. 2 is a block diagram illustrating a processor according to an exemplary embodiment of the present invention.

As illustrated in FIG. 2, the processor 122 includes the distance determine processor 200, the video communication control processor 210, and the graphic user interface processor 220.

The distance determine processor 200 includes at least one instruction for executing the distance determine program 113 of the program storage 111 to estimate the distance from the electronic device to the user's face. For example, the distance determine processor 200 compares the user's face area obtained via the camera system 150 with the user's face area obtained from a reference image at a point of providing the video communication service to determine the distance from the electronic device to the user's face. Here, the reference image denotes an image of the user positioned at a reference distance.

For another example, the distance determine processor 200 may compare each distance of the user's eyes, nose, and mouth obtained via the camera system 150 with each distance of the user's eyes, nose, and mouth obtained from the reference image at a point of providing the video communication service to determine the distance from the electronic device to the user's face.

For still another example, the distance determine processor 200 may determine the distance from the electronic device to the user's face with consideration of a time difference between a point of generating ultrasonic waves and a point at which ultrasonic waves are reflected and received using an ultrasonic sensor of the sensing unit 190.

For still yet another example, the distance determine processor 200 may determine the distance from the electronic device to the user's face with consideration of an amount of coordinate change based on a coordinate of a point of providing the video communication service using an acceleration sensor of the sensing unit 190.

The video communication control processor 210 includes at least one instruction for executing the video communication control program 114 of the program storage 111 to determine a control variable of video communication data with consideration of the distance from the electronic device to the user's face, and providing the video communication service with consideration of the control variable. Here, the control variable includes at least one of a transmission volume weight of video communication data, a reception volume weight, a microphone sensitivity weight, a screen size weight, and a camera magnification weight. For example, the video communication control processor 210 determines the transmission volume weight with consideration of the distance from the electronic device to the user's face. In the case where a voice for the video communication service is detected, the video communication control processor 210 updates the volume of the detected voice with consideration of the transmission volume weight. At this point, the video communication control processor 210 transmits video communication data including the updated voice.

For another example, the video communication control processor 210 determines the transmission volume weight with consideration of the distance from the electronic device to the user's face. In the case where a voice for the video communication service is detected, the video communication control processor 210 transmits video communication data including the detected voice and the transmission volume weight.

For still another example, the video communication control processor 210 determines the reception volume weight with consideration of the distance from the electronic device to the user's face. In the case where video communication data is received, the video communication control processor 210 transmits a voice included in the video communication data with consideration of the reception volume weight.

For still yet another example, the video communication control processor 210 determines the microphone sensitivity weight with consideration of the distance from the electronic device to the user's face. After determining the microphone sensitivity weight, the video communication control processor 210 determines microphone sensitivity with consideration of the microphone sensitivity weight. After that, the video communication control processor 210 detects a voice for the video communication service via a microphone. At this point, the video communication control processor 210 transmits video communication data including the detected voice. In the case where the distance from the electronic device to the user's face is greater than the reference distance, the video communication control processor 210 raises the microphone sensitivity. Also, in the case where the distance from the electronic device to the user's face is less than the reference distance, the video communication control processor 210 lowers the microphone sensitivity.

For another example, the video communication control processor 210 determines a screen size weight of video communication data with consideration of the distance from the electronic device to the user's face. In the case where video communication data is received, the video communication control processor 210 determines a screen size of a communication counterpart included in the video communication data with consideration of the screen size weight. At this point, the video communication control processor 210 displays an image of the communication counterpart included in the video communication data with consideration of the determined screen size. In the case where the distance from the electronic device to the user's face is greater than the reference distance, the video communication control processor 210 determines to magnify the screen size based on the face of the communication counterpart in the image. Also, in the case where the distance from the electronic device to the user's face is less than the reference distance, the video communication control processor 210 determines to maintain the screen size of the communication counterpart in the image as a basic size.

For still another example, the video communication control processor 210 determines a camera magnification weight with consideration of the distance from the electronic device to the user's face. After determining the camera magnification weight, the video communication control processor 210 obtains an image of the user via the camera system 150. At this point, the video communication control processor 210 transmits video communication data including an image of the user obtained via the camera system 150.

The graphic user interface processor 220 executes the user interface program 115 of the program storage 111 to provide and display graphics on the display unit 162. For example, the graphic user interface processor 220 includes an instruction for displaying the video communication service on the display unit 162 with consideration of the control variable of the video communication data in cooperation with the video communication control processor 210.

In the above exemplary embodiment, the electronic device 100 includes the distance determine program 113 for determining the control variable of the video communication data with consideration of the distance from the electronic device to the user's face, the video communication control program 114, and the graphic user interface program 115 in the program storage 111. Accordingly, the processor 122 of the electronic device 100 configured as in FIG. 2 executes the program included in the program storage 111 to determine the control variable of the video communication data with consideration of the distance from the electronic device to the user's face.

In another exemplary embodiment, the electronic device 100 may determine the control variable of the video communication data with consideration of the distance from the electronic device to the user's face using the processor 122 including information of the distance determine program 113, the video communication control program 114, and the graphic user interface program 115. More specifically, the processor 122 configured as in FIG. 2 may include information of the distance determine program 113, the video communication control program 114, and the graphic user interface program 115.

Figure 3:
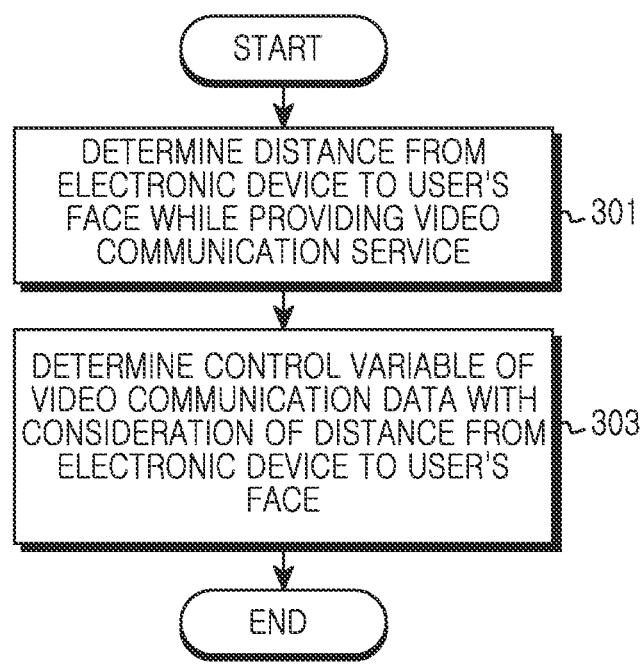
FIG. 3 is a flowchart illustrating a procedure for determining a control variable of video communication data with consideration of a distance from an electronic device to a user's face according to an exemplary embodiment of the present invention.

FIG. 3 illustrates a procedure for determining a control variable of video communication data with consideration of a distance from an electronic device to a user's face according to an exemplary embodiment of the present invention.

Referring to FIG. 3, the electronic device determines the distance from the electronic device to the user's face while providing the video communication service in step 301. For example, the electronic device may estimate the distance from the electronic device to the user's face with consideration of the user's face area and each distance of the user's eyes, nose, and mouth obtained via the camera system 150. For another example, the electronic device may estimate the distance from the electronic device to the user's face using the ultrasonic sensor and the acceleration sensor of the sensing unit 190.

After determining the distance from the electronic device to the user's face, the electronic device proceeds to step 303 to determine a control variable of the video communication data with consideration of the distance from the electronic device to the user's face. Here, the control variable includes at least one of a transmission volume weight of video communication data, a reception volume weight, a microphone sensitivity weight, a screen size weight, and a camera magnification weight.

After that, the electronic device ends the present algorithm.

In the above exemplary embodiment, the electronic device periodically determines the distance from the electronic device to the user's face. In another exemplary embodiment, the electronic device may determine the distance from the electronic device to the user's face every predetermined time.

Also, in an exemplary embodiment, the electronic device determines the distance from the electronic device to the user's face simultaneously with starting of the video communication service. In another exemplary embodiment, the electronic device may determine the distance from the electronic device to the user's face after the electronic device is connected with a communication counterpart via the video communication service.

Though not shown, the electronic device determines a control variable of video communication data with consideration of the distance from the electronic device to the user's face, and transmits video communication data with consideration of the control variable. Also, the electronic device may provide video communication data to a user of the electronic device with consideration of the control variable.

As described above, the electronic device determines the control variable of the video communication data with consideration of the distance from the electronic device to the user's face. At this point, the electronic device may include respective means for determining the control variable of the video communication data with consideration of the distance from the electronic device to the user's face. Also, the electronic device may include single means including respective means for determining the control variable of the video communication data with consideration of the distance from the electronic device to the user's face.

Figure 4:
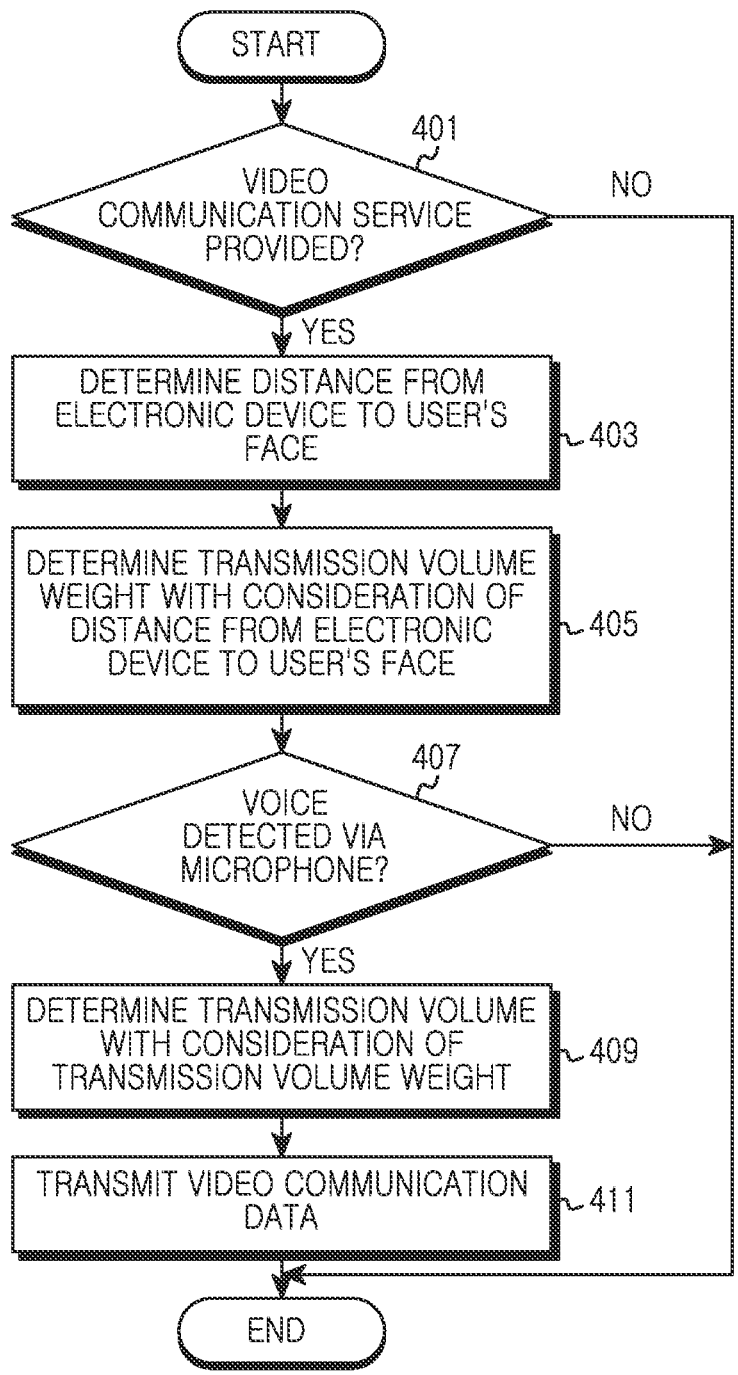
FIG. 4 is a flowchart illustrating a procedure for determining a transmission volume with consideration of a distance from an electronic device to a user's face according to an exemplary embodiment of the present invention.

FIG. 4 illustrates a procedure for determining a transmission volume with consideration of a distance from an electronic device to a user's face according to an exemplary embodiment of the present invention. FIG. 11 is a view illustrating a transmission volume weight table with consideration of a distance from an electronic device to a user's face according to an exemplary embodiment of the present invention.

Referring to FIG. 4, the electronic device determines whether to provide a video communication service in step 401. For example, the electronic device determines whether a video communication application is selected by a user. After that, the electronic device requests a video communication connection using a phone number input by the user in the video communication application. In the case where the video communication service is not provided, the electronic device ends the present algorithm.

In contrast, in the case where the video communication service is provided, the electronic device proceeds to step 403 to determine the distance from the electronic device to the user's face. For example, the electronic device compares the user's face area obtained via the camera system 150 with the user's face area obtained from a reference image at a point of providing the video communication service to determine the distance from the electronic device to the user's face. Here, the reference image denotes an image of the user positioned at a reference distance.

For another example, the electronic device may compare each distance of the user's eyes, nose, and mouth obtained via the camera system 150 with each distance of the user's eyes, nose, and mouth obtained from the reference image at a point of providing the video communication service to determine the distance from the electronic device to the user's face.

For still another example, the electronic device may determine the distance from the electronic device to the user's face with consideration of a time difference between a point of generating ultrasonic waves and a point at which ultrasonic waves are reflected and received using an ultrasonic sensor of the sensing unit 190.

For still yet another example, the electronic device may determine the distance from the electronic device to the user's face with consideration of an amount of coordinate change based on a coordinate of a point of providing a video communication service using an acceleration sensor of the sensing unit 190.

After determining the distance from the electronic device to the user's face, the electronic device proceeds to step 405 to determine a transmission volume weight with consideration of the distance from the electronic device to the user's face. For example, as illustrated in FIG. 11, the electronic device determines a transmission volume weight 1107 corresponding to the distance 1105 from the electronic device to the user's face using a transmission volume weight table 1101. At this point, the electronic device determines "equal to or greater than 20 cm and less than 25 cm" among the distance from the electronic device to the user's face as the reference distance 1103 to determine a reference weight 1109 as "×1.0".

After determining the transmission volume weight with consideration of the distance from the electronic device to the user's face, the electronic device proceeds to step 407 to determine whether a voice is detected via a microphone. In the case where the voice is not detected via the microphone, the electronic device ends the present algorithm.

In contrast, in the case where the voice is detected via the microphone, the electronic device proceeds to step 409 to determine a transmission volume for the voice detected via the microphone with consideration of the transmission volume weight determined depending on the distance from the electronic device to the user's face. For example, in the case where the weight is determined as "×1.4" and voice of "40 decibel (dB)" is detected via the microphone, the electronic device updates the voice of "40 decibel (dB)" using "56 decibel (dB)" with consideration of the weight of "×1.4".

After determining the transmission volume with consideration of the transmission volume weight, the electronic device proceeds to step 411 to transmit video communication data. At this point, the electronic device transmits the updated voice data with consideration of the transmission volume determined depending on the transmission volume weight.

After that, the electronic device ends the present algorithm.

Figure 5:
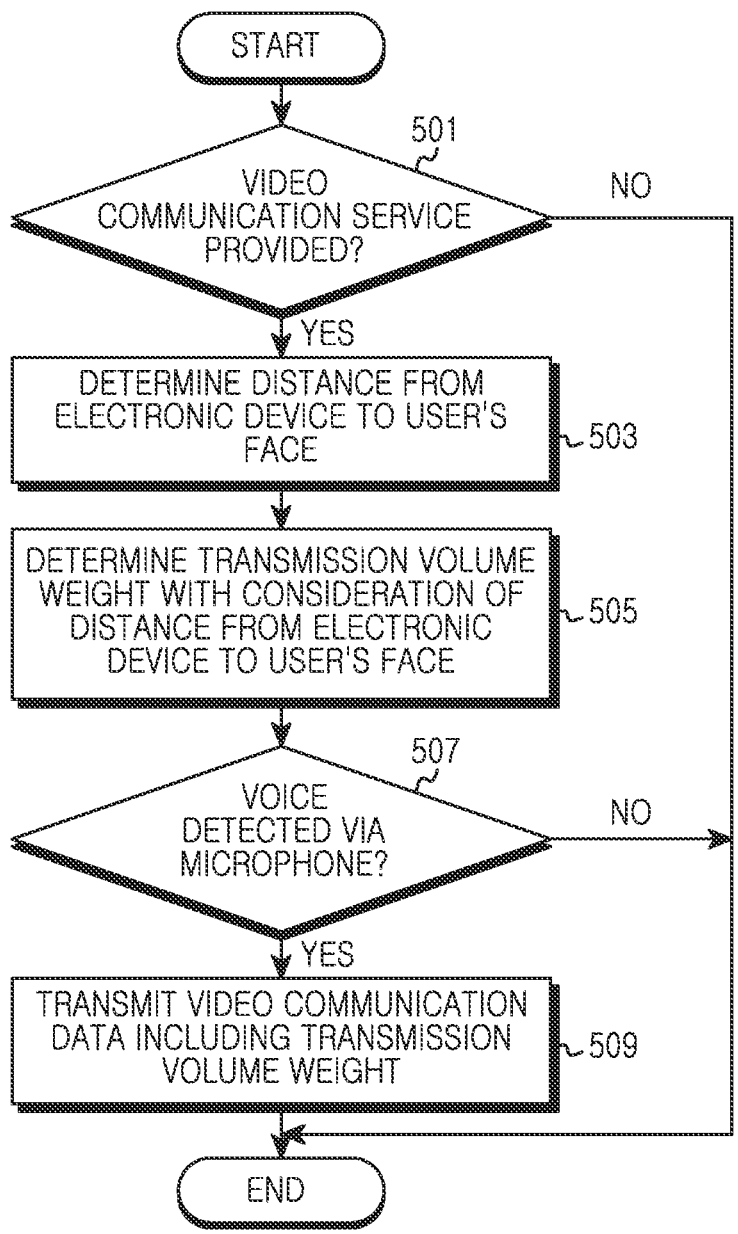
FIG. 5 is a flowchart illustrating a procedure for determining a transmission volume with consideration of a distance from an electronic device to a user's face according to another exemplary embodiment of the present invention.

FIG. 5 illustrates a procedure for determining a transmission volume with consideration of a distance from an electronic device to a user's face according to another exemplary embodiment of the present invention.

Referring to FIG. 5, the electronic device determines whether to provide the video communication service in step 501. For example, the electronic device determines whether the video communication application is selected by a user. After that, the electronic device requests a video communication connection using a phone number input by the user in the video communication application. In the case where the video communication service is not provided, the electronic device ends the present algorithm.

In contrast, in the case where the video communication service is provided, the electronic device proceeds to step 503 to determine the distance from the electronic device to the user's face. For example, the electronic device compares the user's face area obtained via the camera system 150 with the user's face area obtained from a reference image at a point of providing the video communication service to determine the distance from the electronic device to the user's face. Here, the reference image denotes an image of the user positioned at a reference distance.

For another example, the electronic device may compare each distance of the user's eyes, nose, and mouth obtained via the camera system 150 with each distance of the user's eyes, nose, and mouth obtained from the reference image at a point of providing the video communication service to determine the distance from the electronic device to the user's face.

For still another example, the electronic device may determine the distance from the electronic device to the user's face with consideration of a time difference between a point of generating ultrasonic waves and a point at which ultrasonic waves are reflected and received using an ultrasonic sensor of the sensing unit 190.

For still yet another example, the electronic device may determine the distance from the electronic device to the user's face with consideration of an amount of coordinate change based on a coordinate of a point of providing a video communication service using an acceleration sensor of the sensing unit 190.

After determining the distance from the electronic device to the user's face, the electronic device proceeds to step 505 to determine a transmission volume weight with consideration of the distance from the electronic device to the user's face. For example, as illustrated in FIG. 11, the electronic device determines a transmission volume weight 1107 corresponding to the distance 1105 from the electronic device to the user's face using the transmission volume weight table 1101. At this point, the electronic device determines "equal to or greater than 20 cm and less than 25 cm" among the distance from the electronic device to the user's face as the reference distance 1103 to determine a reference weight 1109 as "×1.0".

After determining the transmission volume weight with consideration of the distance from the electronic device to the user's face, the electronic device proceeds to step 507 to determine whether a voice is detected via a microphone. In the case where the voice is not detected via the microphone, the electronic device ends the present algorithm.

In contrast, in the case where the voice is detected via the microphone, the electronic device proceeds to step 509 to transmit video communication data including the transmission volume weight determined depending on the distance from the electronic device to the user's face. Here, it is assumed that an electronic device of the communication counterpart may determine a volume of voice data included in video communication data received with consideration of a received transmission volume weight.

After that, the electronic device ends the present algorithm.

Figure 6:
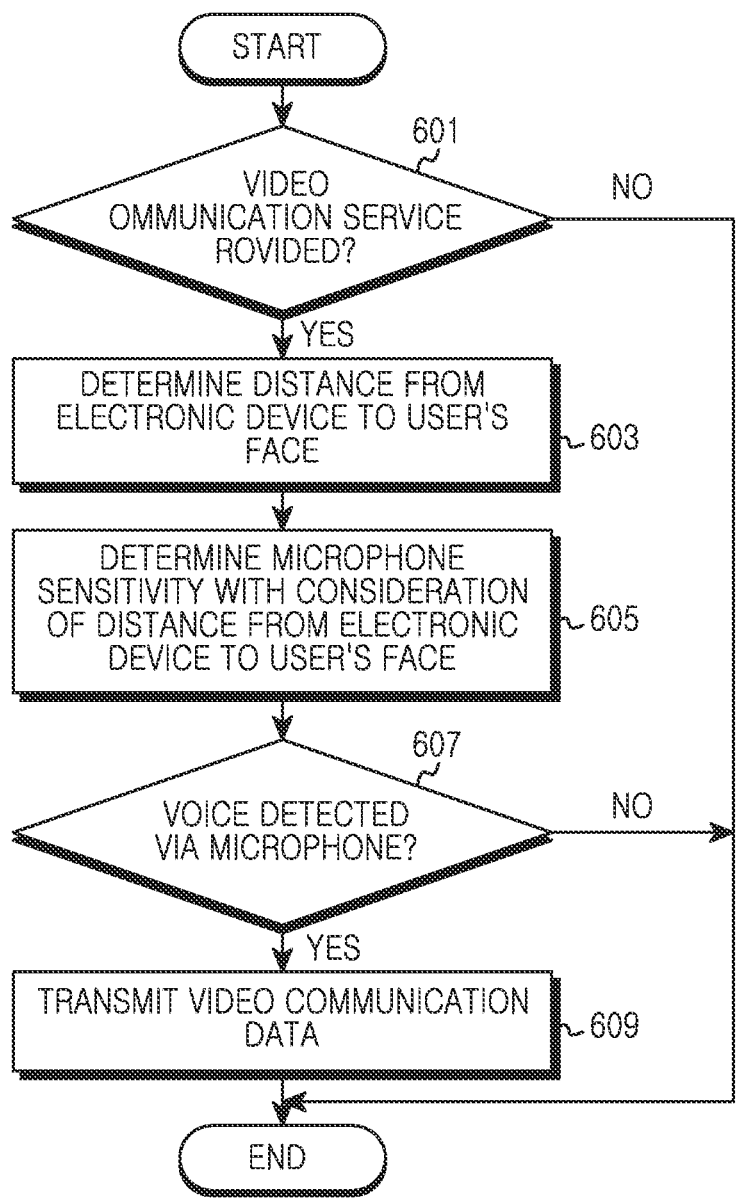
FIG. 6 is a flowchart illustrating a procedure for determining a microphone sensitivity with consideration of a distance from an electronic device to a user's face according to an exemplary embodiment of the present invention.

FIG. 6 illustrates a procedure for determining a microphone sensitivity with consideration of a distance from an electronic device to a user's face according to an exemplary embodiment of the present invention.

Referring to FIG. 6, the electronic device determines whether to provide the video communication service in step 601. For example, the electronic device determines whether the video communication application is selected by a user. After that, the electronic device requests a video communication connection using a phone number input by the user in the video communication application. In the case where the video communication service is not provided, the electronic device ends the present algorithm.

In contrast, in the case where the video communication service is provided, the electronic device proceeds to step 603 to determine the distance from the electronic device to the user's face. For example, the electronic device compares the user's face area obtained via the camera system 150 with the user's face area obtained from a reference image at a point of providing the video communication service to determine the distance from the electronic device to the user's face. Here, the reference image denotes an image of the user positioned at a reference distance.

For another example, the electronic device may compare each distance of the user's eyes, nose, and mouth obtained via the camera system 150 with each distance of the user's eyes, nose, and mouth obtained from the reference image at a point of providing the video communication service to determine the distance from the electronic device to the user's face.

For still another example, the electronic device may determine the distance from the electronic device to the user's face with consideration of a time difference between a point of generating ultrasonic waves and a point at which ultrasonic waves are reflected and received using an ultrasonic sensor of the sensing unit 190.

For still yet another example, the electronic device may determine the distance from the electronic device to the user's face with consideration of an amount of coordinate change based on a coordinate of a point of providing a video communication service using an acceleration sensor of the sensing unit 190.

After determining the distance from the electronic device to the user's face, the electronic device proceeds to step 605 to determine microphone sensitivity with consideration of the distance from the electronic device to the user's face. For example, in the case where the distance from the electronic device to the user's face is greater than the reference distance, the electronic device raises the microphone sensitivity. For another example, in the case where the distance from the electronic device to the user's face is less than the reference distance, the electronic device lowers the microphone sensitivity.

After determining the microphone sensitivity with consideration of the distance from the electronic device to the user's face, the electronic device proceeds to step 607 to determine whether a voice is detected via the microphone. At this point, the electronic device detects the voice via the microphone with consideration of the microphone sensitivity determined depending on the distance from the electronic device to the user's face. For example, in the case where the microphone sensitivity is determined to be high, the electronic device may detect the voice of a volume lower than the voice detectable at a reference microphone sensitivity. For another example, in the case where the microphone sensitivity is determined to be low, the electronic device may attenuate the voice of a volume higher than the voice detectable at the reference microphone sensitivity. In the case where the voice is not detected via the microphone, the electronic device ends the present algorithm.

In contrast, in the case where the voice is detected via the microphone, the electronic device proceeds to step 609 to transmit video communication data including the detected voice.

After that, the electronic device ends the present algorithm.

Figure 7:
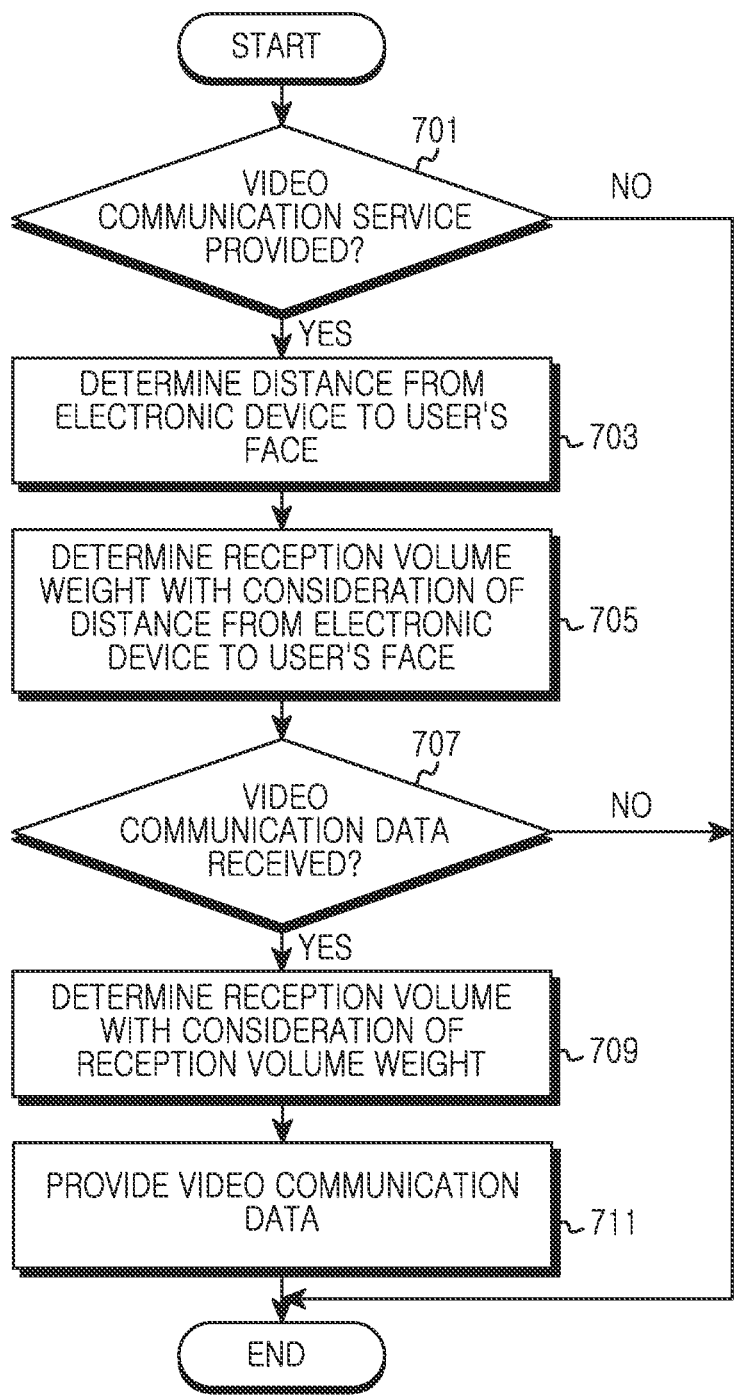
FIG. 7 is a flowchart illustrating a procedure for determining a reception volume with consideration of a distance from an electronic device to a user's face according to an exemplary embodiment of the present invention.

FIG. 7 illustrates a procedure for determining a reception volume with consideration of a distance from an electronic device to a user's face according to an exemplary embodiment of the present invention.

Referring to FIG. 7, the electronic device determines whether to provide the video communication service in step 701. For example, the electronic device determines whether the video communication application is selected by a user. After that, the electronic device requests a video communication connection using a phone number input by the user in the video communication application. In the case where the video communication service is not provided, the electronic device ends the present algorithm.

In contrast, in the case where the video communication service is provided, the electronic device proceeds to step 703 to determine the distance from the electronic device to the user's face. For example, the electronic device compares the user's face area obtained via the camera system 150 with the user's face area obtained from a reference image at a point of providing the video communication service to determine the distance from the electronic device to the user's face. Here, the reference image denotes an image of the user positioned at a reference distance.

For another example, the electronic device may compare each distance of the user's eyes, nose, and mouth obtained via the camera system 150 with each distance of the user's eyes, nose, and mouth obtained from the reference image at a point of providing the video communication service to determine the distance from the electronic device to the user's face.

For still another example, the electronic device may determine the distance from the electronic device to the user's face with consideration of a time difference between a point of generating ultrasonic waves and a point at which ultrasonic waves are reflected and received using an ultrasonic sensor of the sensing unit 190.

For still yet another example, the electronic device may determine the distance from the electronic device to the user's face with consideration of an amount of coordinate change based on a coordinate of a point of providing a video communication service using an acceleration sensor of the sensing unit 190.

After determining the distance from the electronic device to the user's face, the electronic device proceeds to step 705 to determine a reception volume weight with consideration of the distance from the electronic device to the user's face. For example, as illustrated in FIG. 11, the electronic device determines the reception volume weight 1107 corresponding to the distance 1105 from the electronic device to the user's face using the reception volume weight table 1101. At this point, the electronic device determines "equal to or greater than 20 cm and less than 25 cm" among the distance from the electronic device to the user's face as the reference distance 1103 to determine a reference weight 1109 as "×1.0".

After determining the reception volume weight with consideration of the distance from the electronic device to the user's face, the electronic device proceeds to step 707 to determine whether video communication data is received. In the case where the video communication data is not received, the electronic device recognizes that a counterpart for video communication is not connected. Accordingly, the electronic device ends the present algorithm.

In contrast, in the case where the video communication data is received, the electronic device proceeds to step 709 to determine a reception volume for a voice included in the received video communication data with consideration of the reception volume weight determined depending on the distance from the electronic device to the user's face. For example, in the case where the weight is determined as "×1.4" and voice data of "40 decibel (dB)" is received, the electronic device updates the reception volume by replacing the voice of "40 decibel (dB)" by "56 decibel (dB)" with consideration of the weight of "×1.4".

After determining the reception volume with consideration of the reception volume weight, the electronic device proceeds to step 711 to provide video communication data. At this point, the electronic device transmits voice data updated with consideration of the reception volume determined depending on the distance from the electronic device to the user's face.

After that, the electronic device ends the present algorithm.

Figure 8:
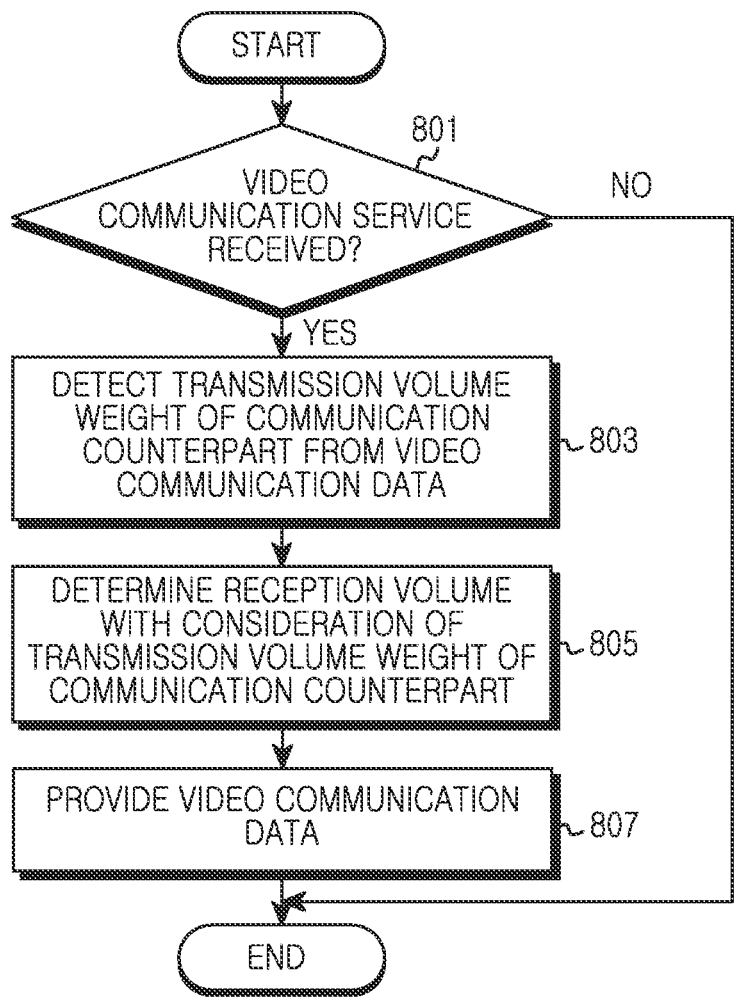
FIG. 8 is a flowchart illustrating a procedure for determining a reception volume with consideration of a distance from an electronic device to a user's face according to an exemplary embodiment of the present invention.

FIG. 8 illustrates a procedure for determining a reception volume with consideration of a distance from an electronic device to a user's face according to an exemplary embodiment of the present invention.

Referring to FIG. 8, the electronic device determines whether video communication data is received in step 801. In the case where the video communication data is not received, the electronic device recognizes that a counterpart for video communication is not connected. Accordingly, the electronic device ends the present algorithm.

In the case where the electronic device receives the video communication data, the electronic device proceeds to step 803 to detect a transmission volume weight of a communication counterpart from the video communication data. For example, as illustrated in FIG. 11, the electronic device determines a reception volume weight 1107 corresponding to the distance 1105 from the electronic device to the user's face using a reception volume weight table 1101. At this point, the electronic device determines "equal to or greater than 20 cm and less than 25 cm" among the distance from the electronic device to the user's face as the reference distance 1103 to determine a reference weight 1109 as "×1.0".

After detecting the transmission volume weight of the communication counterpart, the electronic device proceeds to step 805 to determine a reception volume for a voice included in the received video communication data with consideration of the transmission volume weight of the communication counterpart detected from the received video communication data. For example, in the case where transmission volume weight is "×1.4" and voice data of "40 decibel (dB)" is received, the electronic device determines a reception volume by replacing voice of "40 decibel (dB)" by "56 decibel (dB)" with consideration of the weight of "×1.4".

After determining the reception volume with consideration of the transmission volume weight of the communication counterpart, the electronic device proceeds to step 807 to provide video communication data. At this point, the electronic device transmits voice data updated with consideration of the reception volume determined depending on the transmission volume weight of the communication counterpart.

After that, the electronic device ends the present algorithm.

Figure 9:
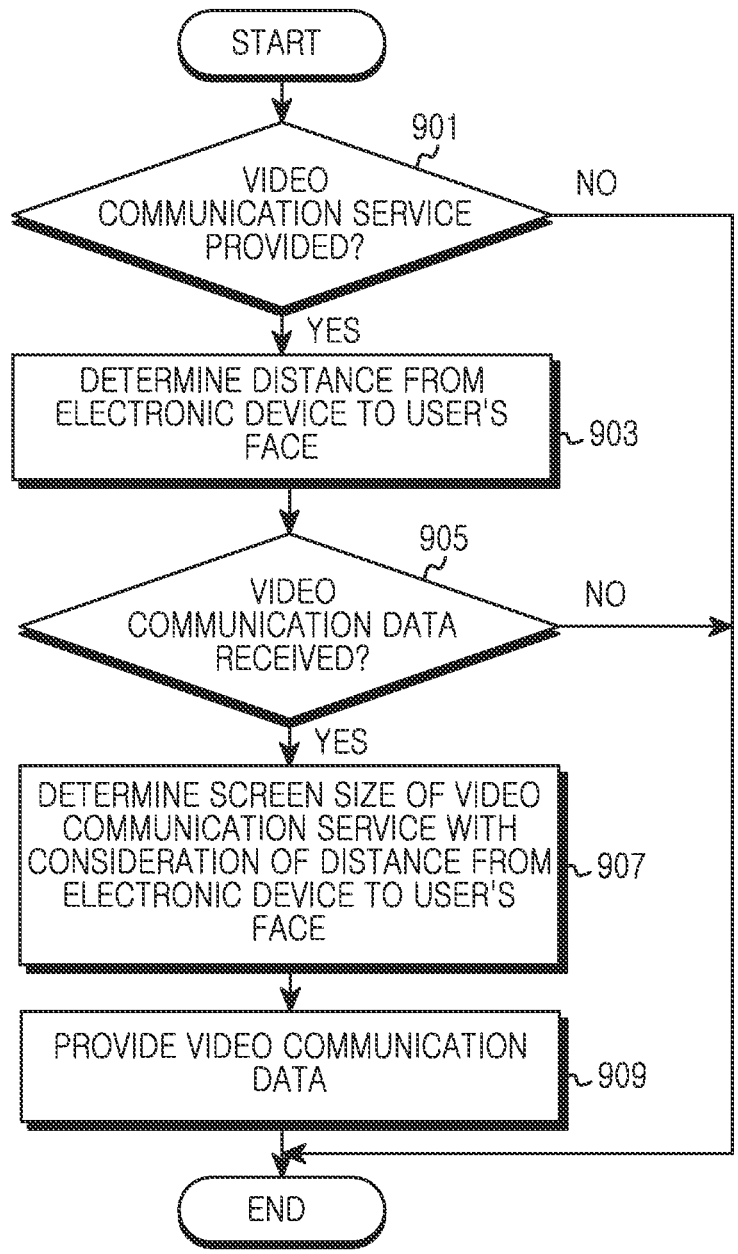
FIG. 9 is a flowchart illustrating a procedure for determining a screen size of video communication data with consideration of a distance from an electronic device to a user's face according to an exemplary embodiment of the present invention.
Figure 12A:
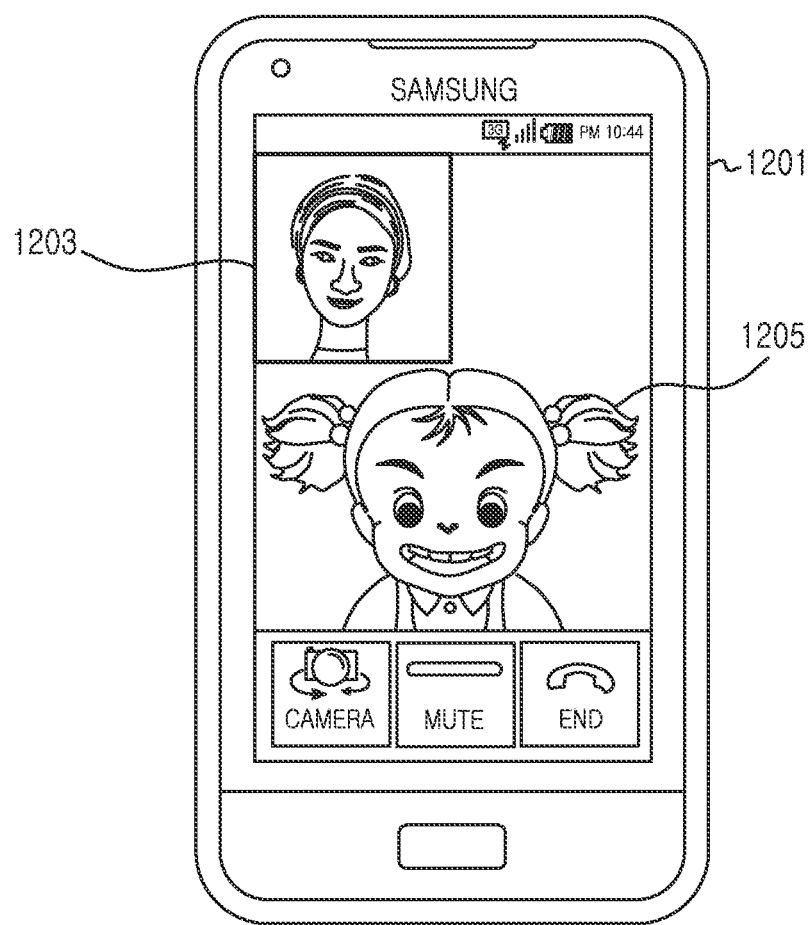
FIGS. 12A to 12C are views illustrating screen configurations for providing a video communication service in an electronic device according to an exemplary embodiment of the present invention.
Figure 12B:
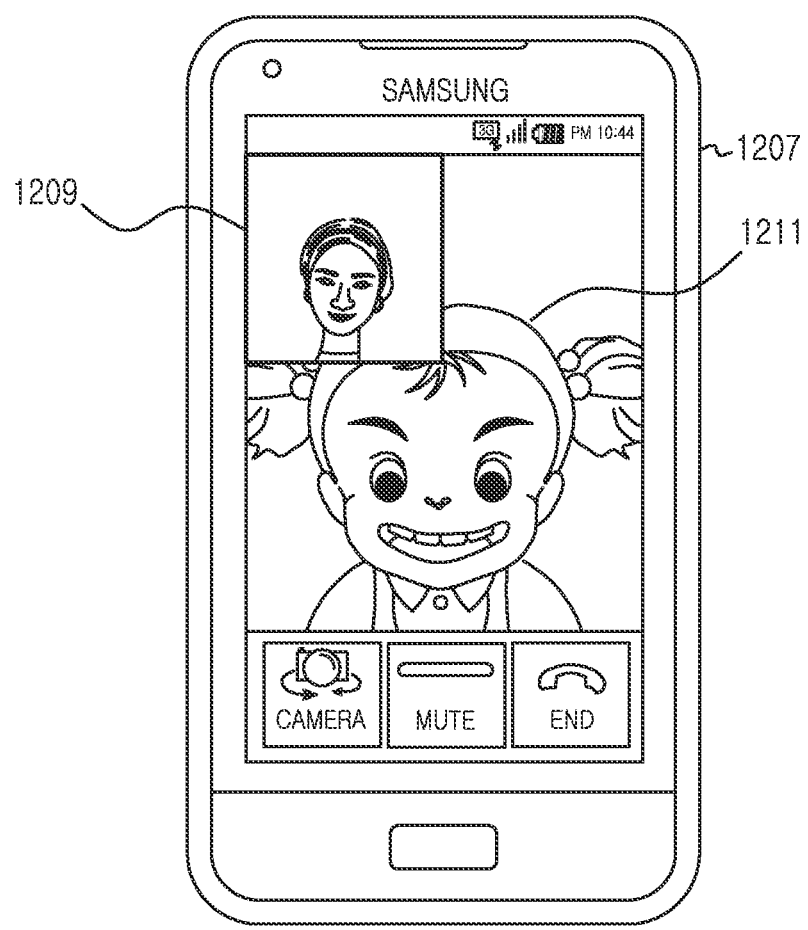
Figure 12C:
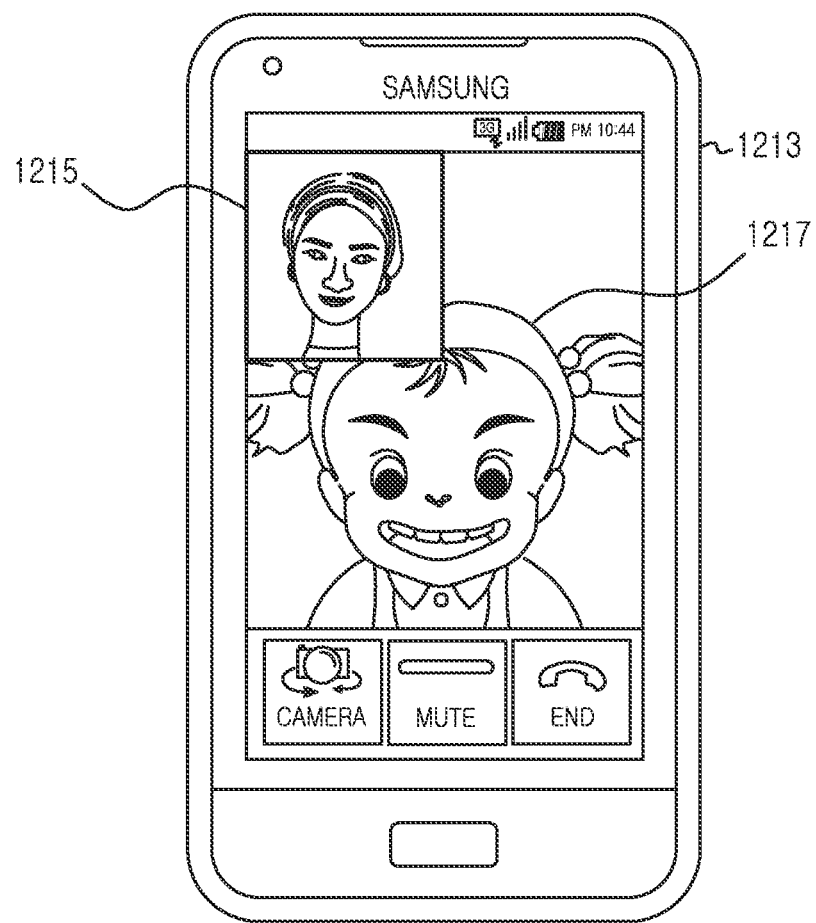

FIG. 9 illustrates a procedure for determining a screen size of video communication data with consideration of a distance from an electronic device to a user's face according to an exemplary embodiment of the present invention. FIGS. 12A to 12C are views illustrating screen configurations for providing a video communication service in an electronic device according to an exemplary embodiment of the present invention.

Referring to FIG. 9, the electronic device determines whether to provide a video communication service in step 901. For example, the electronic device determines whether a video communication application is selected by a user. After that, the electronic device requests a video communication connection using a phone number input by the user in the video communication application. In the case where the video communication service is not provided, the electronic device ends the present algorithm.

In contrast, in the case where the video communication service is provided, the electronic device proceeds to step 903 to determine the distance from the electronic device to the user's face. For example, the electronic device compares the user's face area obtained via the camera system 150 with the user's face area obtained from a reference image at a point of providing the video communication service to determine the distance from the electronic device to the user's face. Here, the reference image denotes an image of the user positioned at a reference distance.

For another example, the electronic device may compare each distance of the user's eyes, nose, and mouth obtained via the camera system 150 with each distance of the user's eyes, nose, and mouth obtained from the reference image at a point of providing the video communication service to determine the distance from the electronic device to the user's face.

For still another example, the electronic device may determine the distance from the electronic device to the user's face with consideration of a time difference between a point of generating ultrasonic waves and a point at which ultrasonic waves are reflected and received using an ultrasonic sensor of the sensing unit 190.

For still yet another example, the electronic device may determine the distance from the electronic device to the user's face with consideration of an amount of coordinate change based on a coordinate of a point of providing a video communication service using an acceleration sensor of the sensing unit 190.

After determining the distance from the electronic device to the user's face, the electronic device proceeds to step 905 to determine whether video communication data is received. In the case where the video communication data is not received, the electronic device recognizes that a counterpart for video communication is not connected. Accordingly, the electronic device ends the present algorithm.

In contrast, in the case where the video communication data is received, the electronic device proceeds to step 907 to determine a screen size of the video communication service with consideration of the distance from the electronic device to the user's face. For example, in the case where the distance from the electronic device to the user's face is greater than a reference distance, the electronic device determines to magnify the screen size based on a face in an image of a communication counterpart. For another example, in the case where the distance from the electronic device to the user's face is less than the reference distance, the electronic device determines to maintain the screen size in the image of the communication counterpart.

After determining the screen size of the video communication service with consideration of the distance from the electronic device to the user's face, the electronic device proceeds to step 909 to provide video communication data. At this point, the electronic device displays the image of the communication counterpart with consideration of the screen size of the video communication service determined depending on the distance from the electronic device to the user's face. For example, as illustrated in FIG. 12B, in the case where the distance from the electronic device to the user's face is greater than the reference distance, the electronic device magnifies an image screen 1211 of the communication counterpart greater than an image screen 1205 of the communication counterpart corresponding to the reference distance (shown in FIG. 12A) in a screen configuration 1207 of the video communication service, and displays the image screen 1211 of the communication counterpart.

For another example, as illustrated in FIG. 12A, in the case where the distance from the electronic device to the user's face is less than the reference distance, the electronic device determines to maintain a size of the image screen 1205 corresponding to the reference distance in the screen configuration 1201 of the video communication service.

After that, the electronic device ends the present algorithm.

Figure 10:
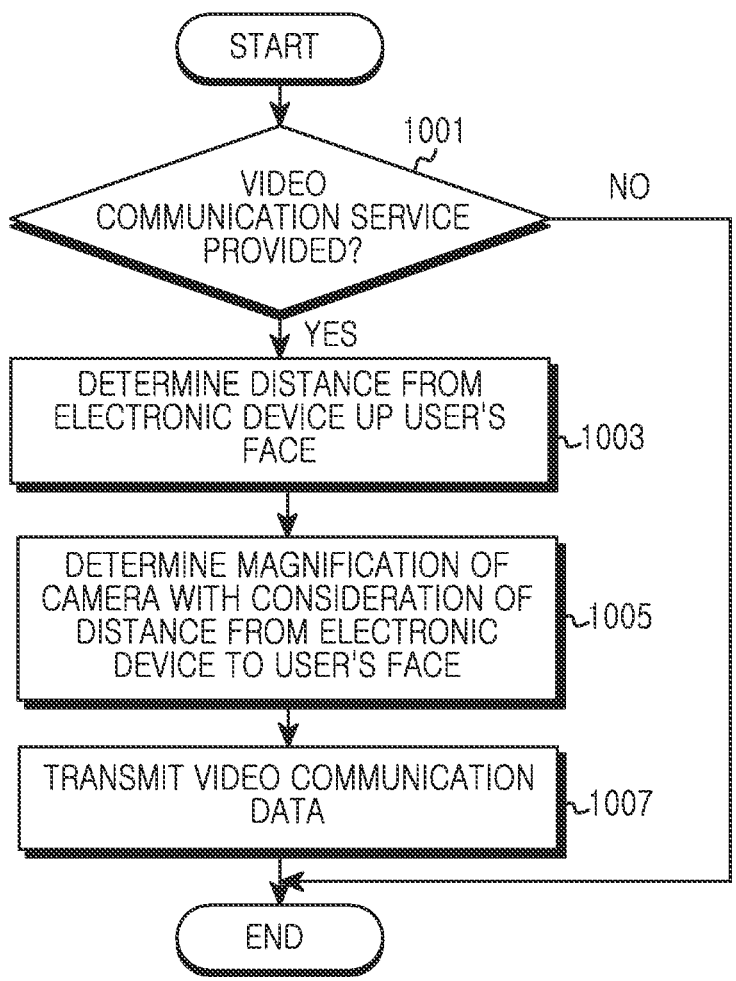
FIG. 10 is a flowchart illustrating a procedure for determining camera magnification with consideration of a distance from an electronic device to a user's face according to an exemplary embodiment of the present invention.

FIG. 10 illustrates a procedure for determining camera magnification with consideration of a distance from an electronic device to a user's face according to an exemplary embodiment of the present invention.

Referring to FIG. 10, the electronic device determines whether to provide a video communication service in step 1001. For example, the electronic device determines whether a video communication application is selected by a user. After that, the electronic device requests a video communication connection using a phone number input by the user in the video communication application. In the case where the video communication service is not provided, the electronic device ends the present algorithm.

In contrast, in the case where the video communication service is provided, the electronic device proceeds to step 1003 to determine the distance from the electronic device to the user's face. For example, the electronic device compares the user's face area obtained via the camera system 150 with the user's face area obtained from a reference image at a point of providing the video communication service to determine the distance from the electronic device to the user's face. Here, the reference image denotes an image of the user positioned at a reference distance.

For another example, the electronic device may compare each distance of the user's eyes, nose, and mouth obtained via the camera system 150 with each distance of the user's eyes, nose, and mouth obtained from the reference image at a point of providing the video communication service to determine the distance from the electronic device to the user's face.

For still another example, the electronic device may determine the distance from the electronic device to the user's face with consideration of a time difference between a point of generating ultrasonic waves and a point at which ultrasonic waves are reflected and received using an ultrasonic sensor of the sensing unit 190.

For still yet another example, the electronic device may determine the distance from the electronic device to the user's face with consideration of an amount of coordinate change based on a coordinate of a point of providing a video communication service using an acceleration sensor of the sensing unit 190.

After determining the distance from the electronic device to the user's face, the electronic device proceeds to step 1005 to determine camera magnification with consideration of the distance from the electronic device to the user's face. For example, in the case where the distance from the electronic device to the user's face is greater than the reference distance, the electronic device determines to increase the magnification of a camera. For another example, in the case where the distance from the electronic device to the user's face is less than the reference distance, the electronic device determines to maintain the camera magnification.

After determining the camera magnification with consideration of the distance from the electronic device to the user's face, the electronic device proceeds to step 1007 to provide video communication data. At this point, the electronic device transmits video communication data including an image of a user obtained via the camera system 150 with consideration of the camera magnification determined depending on the distance from the electronic device to the user's face. For example, in the case where the distance from the electronic device to the user's face is greater than the reference distance, the electronic device to which the camera magnification has not been applied, as illustrated in FIG. 12B, reduces an image screen less than an image screen 1203 of the user corresponding to the reference distance in the screen configuration 1207 of the video communication service and displays the same. At this point, the electronic device to which the camera magnification has been applied, as illustrated in FIG. 12C, transmits an image screen 1215 of the user magnified via the camera system 150 in the screen configuration 1213 of the video communication service.

For another example, as illustrated in FIG. 12A, in the case where the distance from the electronic device to the user's face is less than the reference distance, the electronic device determines to maintain the size of the image screen 1203 corresponding to the reference distance in the screen configuration 1201 of the video communication service.

After that, the electronic device ends the present algorithm.

As described above, an exemplary electronic device of the present invention has an advantage of swiftly providing a video communication service even when a distance between the electronic device and a user is far away by determining a control variable of video communication data with consideration of the distance from the electronic device to the user's face.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for an electronic device, the method comprising:

obtaining an image through the camera module;

detecting a user's face in the obtained image;

comparing a first distance of at least two of an eye, a nose and a mouth obtained from the detected user's face with a reference distance of at least two of the eye, the nose and the mouth obtained from a reference image;

detecting a distance from the electronic device to a user based on the comparison result;

detecting an output control variable of video communication data based on the distance; and providing the video communication service based on the output control variable, wherein the output control variable includes at least one of a transmission volume weight of the video communication data, a reception volume weight, a microphone sensitivity weight, a screen size weight, and a camera magnification weight.

2. The method of claim 1, wherein the providing of the video communication service comprises:

when a voice for the video communication service is detected, updating a volume of the detected voice based on the transmission volume weight; and transmitting the video communication data comprising the updated voice.

3. The method of claim 1, wherein the providing of the video communication service comprises:

when a voice for the video communication service is detected, transmitting video communication data comprising the transmission volume weight and the voice.

4. The method of claim 1, wherein the providing of the video communication service comprises:

when the video communication data is received, transmitting a voice included in the video communication data based on the reception volume weight.

5. The method of claim 1, wherein the providing of the video communication service comprises:

determining a sensitivity of a microphone based on the microphone sensitivity weight;

detecting a voice for the video communication service via the microphone; and transmitting video communication data comprising the detected voice.

6. The method of claim 1, wherein the providing of the video communication service comprises:

when video communication data is received, updating a screen size of a communication counterpart included in the video communication data based on the screen size weight; and displaying an image of the communication counterpart included in the video communication data based on the screen size.

7. The method of claim 1, wherein the providing of the video communication service comprises:

detecting a camera magnification weight of video communication data based on the distance;

detecting a magnification of a camera based on the camera magnification weight;

obtaining an image for the video communication service via the camera; and transmitting video communication data comprising the obtained image.

8. The method of claim 1, wherein the detecting of the distance comprises:

determining the distance from the electronic device to the user using at least one of a camera, an ultrasonic sensor, and an acceleration sensor.

9. An electronic device comprising:

a camera module configured to obtain an image;

a communication interface configured to transmit and receive video communication data; and a processor configured to:

obtain the image through the camera module, detect a user's face in the obtained image, compare a first distance of at least two of an eye, a nose and a mouth obtained from the detected user's face with a reference distance of at least two of the eye, the nose and the mouth obtained from a reference image, detect a distance from the electronic device to a user based on the comparison result, detect an output control variable of the video communication data based on the distance, and provide a video communication service based on the output control variable, wherein the output control variable includes at least one of a transmission volume weight of the video communication data, a reception volume weight, a microphone sensitivity weight, a screen size weight, and a camera magnification weight.

10. The electronic device of claim 9, wherein the processor is configured to provide the video communication service, when a voice for the video communication service is detected, update a volume of the detected voice based on the transmission volume weight, and transmit the video communication data comprising the updated voice via the communication interface.

11. The electronic device of claim 9, wherein the processor is configured to provide the video communication service, when a voice for the video communication service is detected, transmit video communication data comprising the transmission volume weight and the voice via the communication interface.

12. The electronic device of claim 9, further comprising:

an audio processor, wherein the processor is configured to provide the video communication service, when the video communication data is received, control to output a voice included in the video communication data based on the reception volume weight via the audio processor.

13. The electronic device of claim 9, wherein the processor is configured to provide the video communication service determines a sensitivity of a microphone based on the microphone sensitivity weight, detect a voice for the video communication service via the microphone, and transmit video communication data comprising the detected voice via the communication interface.

14. The electronic device of claim 9, further comprising:

a display, wherein the processor is configured to provide the video communication service, when video communication data is received, update a screen size of a communication counterpart included in the video communication data based on the screen size weight, and control to display an image of the communication counterpart included in the video communication data based on the screen size on the display.

15. The electronic device of claim 9, wherein the processor is configured to detect a camera magnification weight of the video communication data based on the distance, detect a magnification of the camera unit based on the camera magnification weight, obtain an image for the video communication service via the camera unit, and control to transmit video communication data comprising the obtained image via the communication interface.

16. The electronic device of claim 9, wherein the processor is configured to detect the distance determines the distance from the electronic device to the user using at least one of a camera, an ultrasonic sensor, and an acceleration sensor.

17. A method for an electronic device, the method comprising:
- detecting a distance from the electronic device to a user based on an amount of movement of the electronic device based on a coordinate of a time point of providing a video communication service;
- detecting an output control variable of video communication data based on the distance; and
- providing the video communication service based on the output control variable,
- wherein the output control variable includes at least one of a transmission volume weight of the video communication data, a reception volume weight, a microphone sensitivity weight, a screen size weight, and a camera magnification weight.

18. An electronic device comprising:
- a camera module configured to obtain an image;
- a communication interface configured to transmit and receive video communication data; and
- a processor configured to:
    - detect a distance from the electronic device to a user based on an amount of movement of the electronic device based on a coordinate of a time point of providing a video communication service,
    - detect an output control variable of the video communication data based on the distance, and
    - provide a video communication service according to the output control variable,
- wherein the output control variable includes at least one of a transmission volume weight of the video communication data, a reception volume weight, a microphone sensitivity weight, a screen size weight, and a camera magnification weight.

* * * * *